Sept. 21, 1954 J. L. D. MORRISON 2,689,735

RECORD CHANGER FOR PHONOGRAPHS

Filed Aug. 21, 1950 3 Sheets-Sheet 1

INVENTOR.
James L. D. Morrison
BY Fred Gerlach
his Atty.

Sept. 21, 1954 J. L. D. MORRISON 2,689,735

RECORD CHANGER FOR PHONOGRAPHS

Filed Aug. 21, 1950 3 Sheets-Sheet 2

INVENTOR.

James L. D. Morrison

BY Fred Gerlach

His Atty.

Sept. 21, 1954 J. L. D. MORRISON 2,689,735

RECORD CHANGER FOR PHONOGRAPHS

Filed Aug. 21, 1950 3 Sheets-Sheet 3

INVENTOR.
James L. D. Morrison
By Fred Gerlach
his Atty.

Patented Sept. 21, 1954

2,689,735

UNITED STATES PATENT OFFICE 2,689,735

RECORD CHANGER FOR PHONOGRAPHS

James L. D. Morrison, Benton Harbor, Mich., assignor to V-M Corporation, Benton Harbor, Mich., a corporation of Michigan Application August 21, 1950, Serial No. 180,558

4 Claims. (Cl. 274—10)

The invention relates to record changers for phonographs.

The several objects of the invention are to provide a record changer in which the record changing devices are incorporated within the spindle; with struts foldable into the spindle, for supporting the stack of records, and improved means for operating the struts; with fingers adapted to pass between the contiguous faces of the two lowermost records of the stack for insuring the separation of the lowermost record from the stack; which is adapted for operation with records of varying thicknesses; with improved means for operating the dog for offsetting the record to be dropped; with improved means for operating the fingers for supporting the records during a record-changing operation; which is simple in construction; which is reliable and efficient in operation; which can be economically produced; and other objects which will appear from the detailed description.

The invention consists in the several novel features hereinafter set forth and more particularly defined by claims at the conclusion hereof.

Figures 4, 4A, 5, 6:
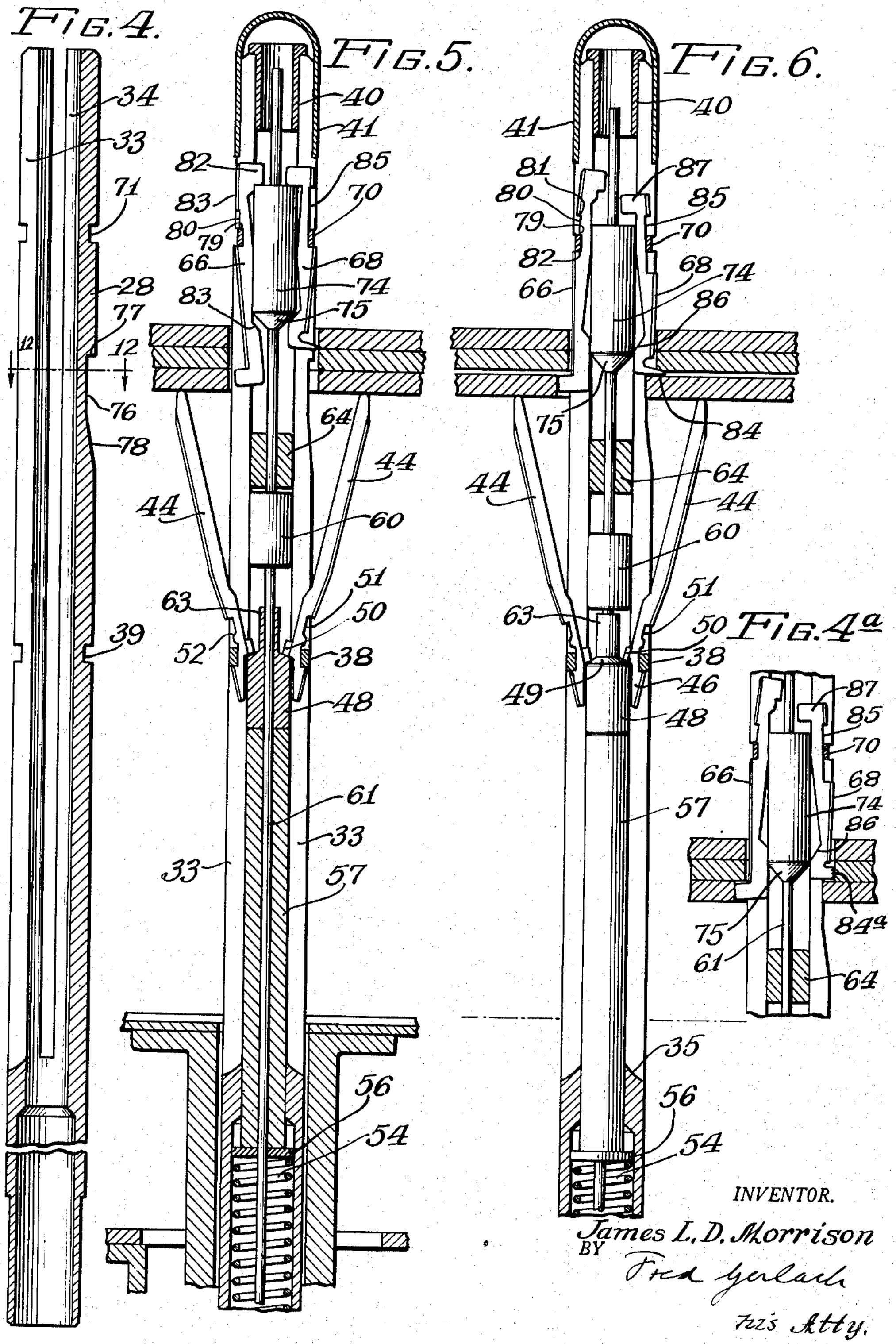
Fig. 4 is a longitudinal section of the spindle on which the records are supported for successive lowering movements onto the turntable.
Figures 7, 8, 9, 10, 11, 12, 13:
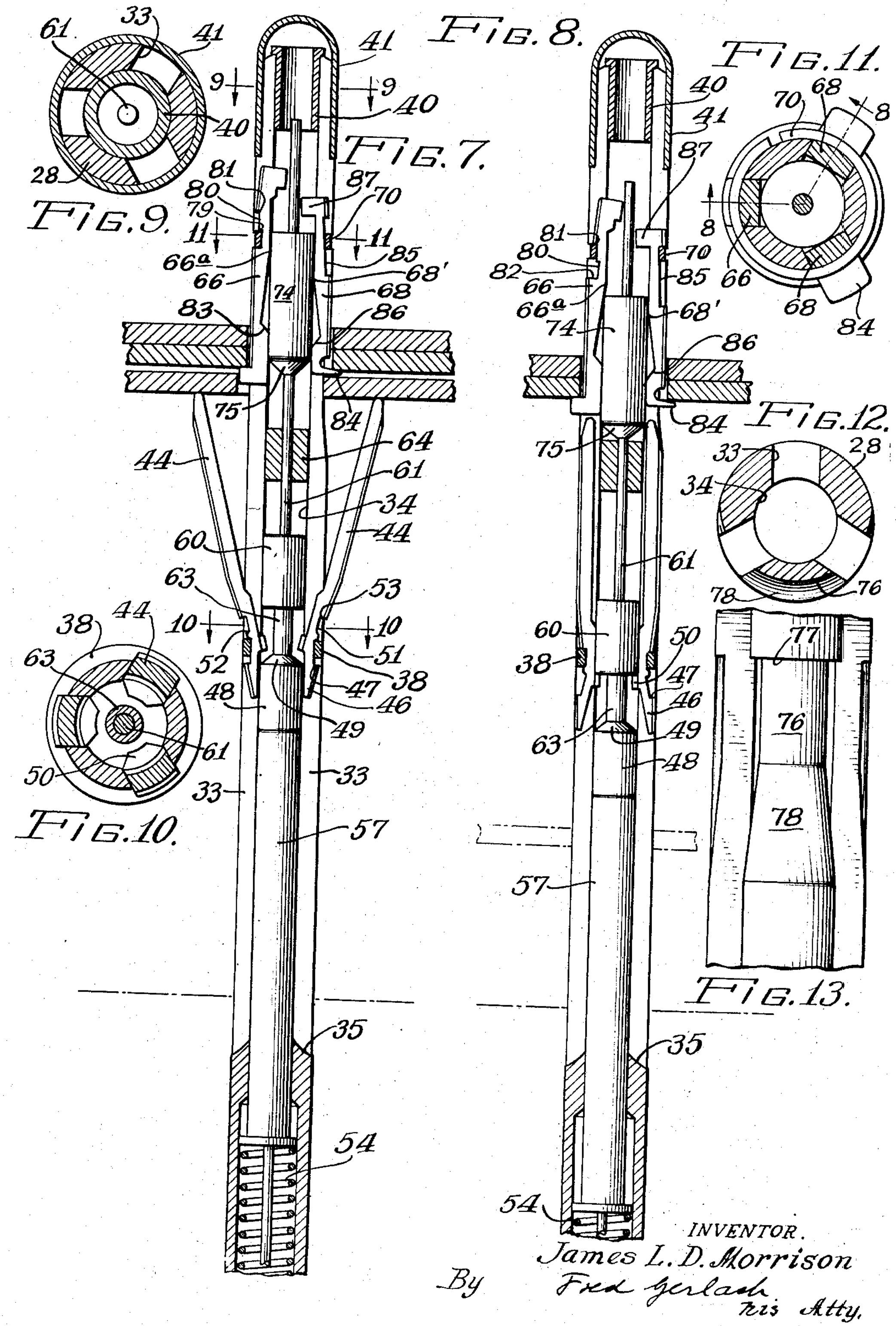

Fig. $4^a$ is a section illustrating a modification of the fingers in the spindle for supporting the records;

Fig. 5 is a section taken on line 5—5 of Fig. 8, illustrating the record-changing mechanism in its normal position, parts being shown in section;

Fig. 6 is a similar section illustrating the record-changing mechanism in the position assumed when the displacing member has shifted the lowermost record of the stack into offset relation to the axis of the spindle and the lower ends of the supporting fingers have passed between the lowermost and the next lower records;

Fig. 7 is a similar view illustrating the record-changing mechanism when the lowermost record has been slightly lowered and separated from the remainder of the stack, in advance of the collapsing of the supporting struts for dropping the lowermost record;

Fig. 8 is a similar view illustrating the supporting struts collapsed and the lowermost record released from the stack and dropping onto the turntable;

Fig. 9 is a section taken on line 9—9 of Fig. 7;

Fig. 10 is a section taken on the line 10—10 of Fig. 7;

Fig. 11 is a section taken on the line 11—11 of Fig. 7;

Fig. 12 is a section taken on the line 12—12 of Fig. 4; and

Fig. 13 is a side elevation of a portion of the spindle.

The invention is exemplified in a phonograph which comprises a suitable supporting frame or base 20, and a turntable 22 which is journalled for horizontal rotation on a bearing 24. Any suitable motor-driven mechanism may be used for driving the turntable, as well understood in the art. Usually the mechanism is applied to engage the inner periphery of a depending flange 26 on the turntable.

The stack of records is supported around a spindle 28 which has a cylindrical periphery and has its lower end fixedly supported in a sleeve 30 which is secured by a set screw 32 in a bracket which is secured to the underside of base 20. The stack is supported above the turntable 22 and the records are successively dropped onto the turntable. Spindle 28 is tubular and provided with a bore 34 and three longitudinal slots 33 which extend from the upper end of the spindle and terminate at 35 and are symmetrically disposed around the axis of the spindle. The slots render the upper portions of the spindle inwardly resilient for slipping a ring 38 into a circumferential groove 39. The upper end of the spindle is fixedly held against contraction by a thimble 40 and a cap 41, after the ring 38 has been inserted and is locked in groove 39.

The stack of records is adapted to be supported on three struts 44 of like construction, which are inwardly collapsible and adapted to enter the slots 33 to permit a record to drop onto the turntable. The struts are supported for pivotal and vertical sliding movement in slots 33 by a ring 38 which is confined against vertical movement in peripheral groove 39 in the spindle. Each strut 44 is provided with a depending leg or extension 46 having a shoulder 47 which is adapted to be urged against the lower face of ring 38 by an upwardly spring-pressed plunger 48, which is provided with a conical shoulder 49 engaging an integral lug 50 on the strut. Each has a notch in its outer edge with slight shoulder 52 having an inclined lower end normally spaced a slight distance above the upper face of ring 38 to permit a slight downward sliding movement of the strut by gravity when plunger 48 is initially withdrawn from engagement with lugs 50. Each strut above shoulder 52 is recessed at 51 with a shoulder 53 at its upper end which permits additional downward movement of the strut so that the shoulders 53 will seat on the upper face of ring 38 for pivotal movement of the struts into slots 33 in the spindle. The plunger 48 is yieldingly urged upwardly by a coil spring 54, the lower end of which is seated on an abutment 55 which is fixed in the bore of spindle 28. The spring 54 engages a washer 56 which is slidable in said bore and a spacer 57 is interposed between said washer and the plunger 48. Spring 54 urges the struts 44 upwardly while conical surface 49 engages lugs 50 and releases pressure from the struts when the plunger 48 is lowered.

The mechanism for changing records also includes a shifter or plunger 60 which is slidable in the bore 34 of spindle 28, is fixed to a rod or wire 61 which extends slidably through plunger 48, spacer 57, spring 54 and abutment 55. The lower end of rod 61 is operated by mechanism hereinafter described for operating and controlling the record-changing mechanism. Plunger 48 is provided with an upward extension 63, which is engageable and shifted by the lower end of plunger 60. Plunger 60 is adapted to be lowered for engaging lugs 50 and positively shifting the struts to swing inwardly while shoulders 52 engage ring 38 and then shifting the struts downwardly until shoulder 53 engages ring 38. During the retractile upward stroke of rod 61, the conical portion 49 will engage the lower ends of lugs 50 and shift the struts until shoulders 47 engage the lower face of ring 38 and the struts are spread into their operative position. Rod 61 is slidably guided in bushing 64 which is fixed in the bore 34 of the spindle.

The record-changing mechanism includes an ejector dog 66 which is pivotally and slidably movable in one of the slots 33 in the spindle, for offsetting the lowermost record of the stack and a pair of fingers 68 in the other slots 33 for supporting the stack of records above the lowermost record during the dropping of the lowermost record. The dog 66 and fingers 68 are yieldingly confined in slots 33 by a split ring 70 which is confined longitudinally in an annular groove 71 in spindle 28. The dog 66 and fingers 68 are operable by a cylindrical shifter 74 or plunger fixed to rod 61 and provided with a conical lower end 75. Dog 66 is confined circumferentially of the spindle in one of the slots 33 in the spindle with its knife edge 84 lying normally in the center hole of the lowermost record of the stack and adapted upon outward pivotal movement of the lower end of the dog to move said record in offset relation to the axis of the spindle. The spindle is cut away as at 76 below a shoulder 77 for the offsetting of the lowermost record by dog 66, and below the cutaway is inclined as at 78 to deflect the record into coaxial relation to the spindle, as the record drops onto the turntable. Shoulder 77 is disposed so it will prevent offsetting of the records above the lowermost record.

An elongated notch 80 in the outer side of dog 66 has a shoulder 81 at its upper end, a shoulder 82 at its lower end, and a slight intermediate shoulder 79. The spring-ring 70 holds the dog against radially outward movement, extends across notch 80, and permits vertical movement of the dog in its recess 33. The dog 66 is also pivotally movable on a fulcrum point $66^a$ on its inner edge. An inclined cam-surface 83 on the inner edge and adjacent the lower end of the dog is engageable by the conical end 75 of shifter 74, for pivotally shifting the dog on fulcrum point $66^a$ for offsetting the lowermost record. During the initial lowering movement of shifter 74, the portion of the notch 80 between shoulders 82 and 79 will be seated on ring 70 and hold the dog against downward sliding movement.

Each finger 68 is circumferentially confined in a slot 33 in the spindle and is pivotally movable transversely and vertically movable therein. Each finger is provided at its lower end with an outwardly extending member having a knife edge 84 adapted to pass between and separate the two lowermost records from each other and to support the remaining records after the lowermost record has been dropped to the turntable, and until the struts are positioned to support the records remaining in the stack. Each finger is provided in its outer side with a notch 85, across which the spring-ring 70 extends. Notch 85 has shoulders at its upper and lower ends and permits limited vertical sliding movement of the fingers 68 in its slot 33. The inner face of each finger 68 is provided with a fulcrum point 68′ for pivotal movement of the finger in its slot 33 to cause its knife edge to pass between the two lower records and to retract the knife edge into the holes in the records. A cam-surface 86 on each finger 68 is engageable by the conical portion 75 during the downstroke of shifter 74 to pivotally shift the lower end of the finger outwardly, and for slidably shifting the finger downwardly. An abutment or shoulder 87 on the upper end of each finger is engageable by the upper end of shifter 74 for raising the finger and pivotally retracting the finger after the cam 86 has passed under conical portion 75 of shifter 74 during the upstroke of said shifter. The fingers 68, when the lowermost record has been dropped, are lowered by the weight of the records thereon so the lowermost record will move into position where it can be offset. The fingers are then arrested by the shoulders at the upper end of notches 85. During this lowering movement of the fingers, the shoulder 79 on dog 66 will clear the ring 70, because the shifter 74 is below the fulcrum point 66′ and permits the dog to descend until it is arrested by shoulder 80 and ring 70. During the upstroke of shifter 74, its upper end will engage abutments 87 on the fingers 68, and pivotally retract them when cam 86 passes under conical member 75, then raise the fingers until the lower shoulders of notches 85 engage the lower end of ring 70 and arrest further upward travel of the fingers.

The mechanism for operating rod 61 for each record-changer, comprises a forked member 90 slidably mounted in the lower end of spindle 28 and sleeve 30, and fixedly secured to the lower end of said rod, a plate 91 carried by a roller 92 which is journalled in the sleeve 30, and is positioned in a horizontal slot 93 in said plate, and a roller 95 carried in the slot of member 90 and extending through a cam slot 94 in plate 91. Reciprocating movement imparted to plate 91 in the slot in member 90 and sleeve 30 will cause the cam slot to operate roller 95 to raise and lower rod 61 and the elements attached thereto for operating the record-changing mechanism.

The record-changing mechanism is controlled to release a record from the stack upon the completion of the playing of the record on the turntable, as well understood in the art. This control mechanism includes a gear 96 which is adapted to be driven from a pinion 97 which rotates with the turntable, and is provided with an eccentric stud 98 extending into a slot 99 in an arm 100 which is suitably mounted on a support 102 to slide radially of the axis of spindle 28. Eccentric stud 98 travels in a circular path around the axis of gear 96 and in a slot 99. Arm 100 has pivoted thereto at 101, one end of cam plate 91 for reciprocating said plate and operating cam slot 94 to raise and lower roller 95 and the rod 61 which operates plunger 60 and shifter 74. Suitable control mechanism (not shown) causes pinion 97 to drive gear 96 a cycle of one revolution and then stops said gear for each record-change. Such control mechanism may be of any suitable construction well known in the art. Stud 98 during each cycle will impart a reciprocating stroke to arm 100 and cam plate 91. Gear 96 is journalled on the base 20.

Figures 1, 3:
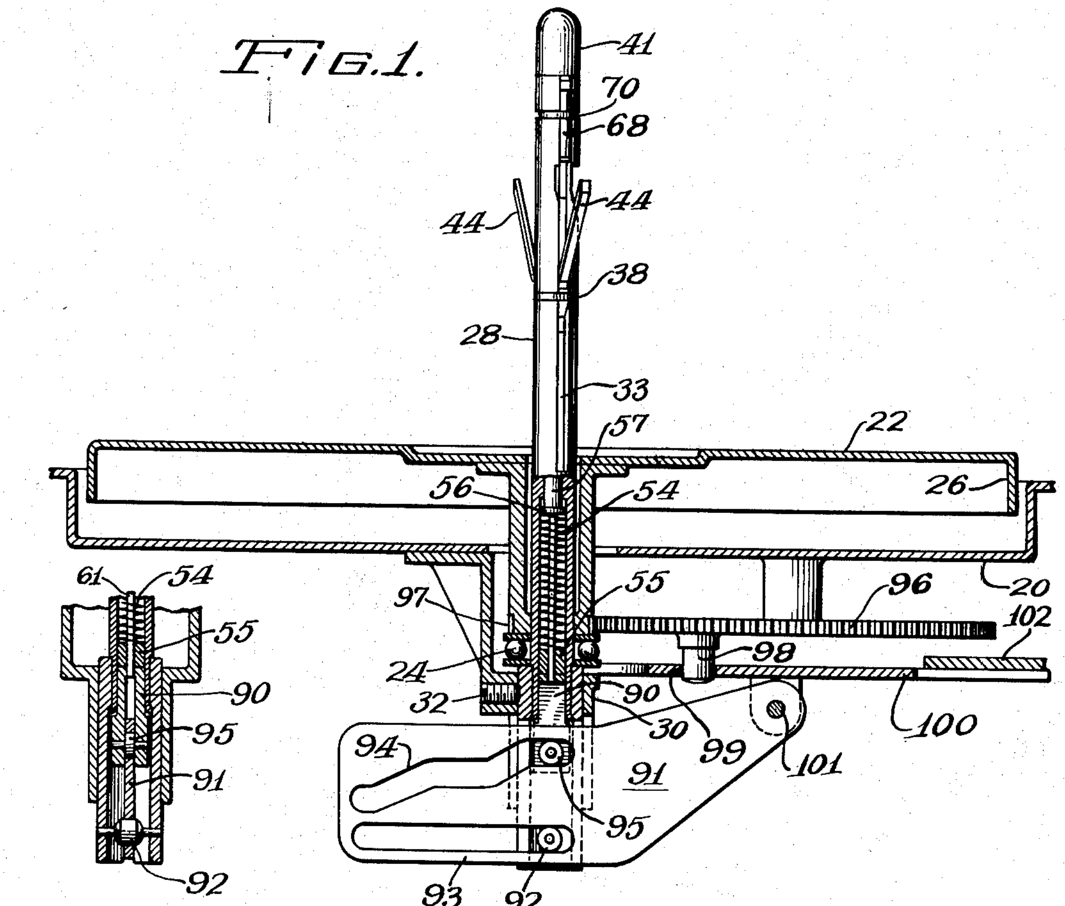
Fig. 1 is a vertical section, parts being shown in elevation of a phonograph equipped with a record changer, embodying the invention.
Fig. 3 is a section taken on line 3—3 of Fig. 2.
Figure 2:
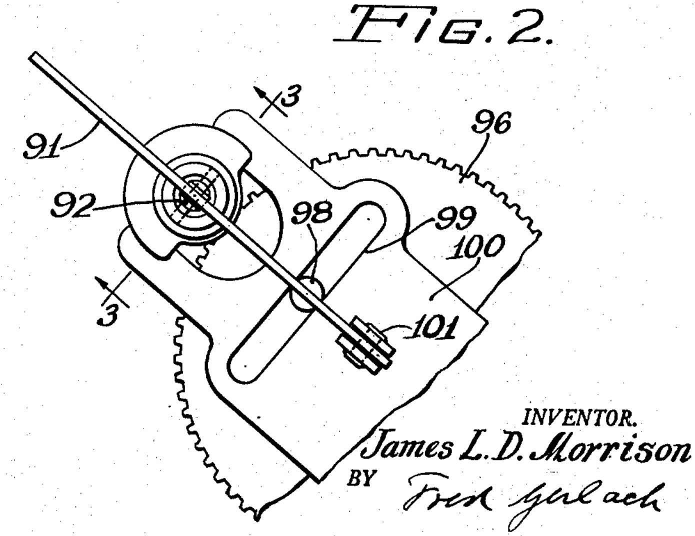
Fig. 2 is an inverted plan of the mechanism for operating the record changer.

The operation will be as follows:

Normally, the record-changing mechanism will be in the position shown in Figs. 1 and 5. The gear 96 will be idle and the turntable with a record thereon will be driven until the record has been played. The struts 44 will support the stack of records above the turntable. At the conclusion of playing the record on the turntable, the control mechanism will cause pinion 97 to drive gear 96 a cycle of one revolution. During said cycle, stud 98 on gear 96 will slide in slot 99 and reciprocate cam plate 91 for a complete operation of the record changer to drop the lowermost record in the stack onto the turntable. During each reciprocation of cam plate 91 the cam slot 94 in said plate will lower and raise roller 95, the sleeve 90, rod 61, plunger 60 and shifter 74.

The dog 66 will normally be positioned in the hole in the lowermost record, as illustrated in Fig. 5. The lower ends 84 of fingers 68 will be disposed in the holes in the records above the lowermost record, which are held against offsetting by the portion of the spindle above shoulder 77 on the spindle, as shown in Fig. 5. The struts 44 will be extended outwardly to support the stack of records on the spindle. When cam plate 91 is shifted from its normal position (Fig. 1) in one direction, a portion of cam slot 94 in cam plate 91 will impart a downstroke to roller 95, rod 61 and shifter 74. During the initial position of the downstroke of rod 61, the conical surface 75 on shifter 74 will engage cam-surface 83 on the dog 66 and pivotally shift said dog to offset the lowermost record as shown in Fig. 6. The conical surface 75 will engage cam-surfaces 86 and lower the fingers 68 until their lower ends are arrested by the offset record, and then surface 75 will slide along cams 86 and swing the lower ends of the fingers outwardly to force knife edges 84 between the contiguous faces of the two lowermost records and separate them to provide clearance between the offset record and the record thereabove. The downward movement of the fingers 68 will then be arrested by the offset record as shown in Fig. 6, while shifter 74 continues its downstroke.

During this operation of dog 66 and fingers 68, the pressure of spring 54 exerted through washer 56 and spacer 57 will urge plunger 48 upwardly and the conical surface 49 will abut against the lower ends of lugs 50 on the struts 44, and shoulders 47 will be arrested by the lower end of ring 38. The struts will then be held in their operative position with the offset record resting thereon. Continuing its downstroke, the lower end of plunger 60 will engage stem 63 and slide plunger 48 downwardly to relieve the upward pressure of the latter plunger against lugs 50 on the struts, and permit the struts to slide downwardly until arrested by the engagement of shoulders 52 with the upper end of ring 38. This will cause the offset record to descend a slight distance below the record next above as shown in Fig. 7. Continuing its continued downstroke, the lower end of plunger 60 will engage the upper ends of lugs 50 on the struts and move the struts bodily downward until cam-shoulders 52 clear the inner edge of ring 38 and shoulders 53 are seated on said ring for swinging the upper ends of the struts inwardly to fold them into the slots 33 in the spindle, and clear the path for the drop of the offset record as illustrated in Fig. 8. The released record will be deflected into concentric relation with the turntable by the inclined surface 78 on the spindle. When the lowermost record is released by the struts, the shifter 74 will be lowered and positioned between dog 66 and fingers 68, to permit the fingers 68 to slide downwardly until they are arrested by ring 70 and the shoulders at the upper end of notches 85, and to permit dog 66 to slide downwardly until it is arrested by the shoulder 82 at the upper end of notch 80. The remaining records in the stack will then be lowered into position to be supported by the struts as shown in Fig. 8.

During the upstroke of rod 61 produced by the return stroke of cam plate 91, the plunger 48 following plunger 60 and impelled upwardly by spring 54 will engage the lower ends of lugs 50 on the struts to swing the struts outwardly and lift them until shoulders 47 are held against the lower end of ring 38, as shown in Fig. 5. The struts will then be positioned to support the stack of records.

During the continuation of the upstroke of rod 61, the conical surface 75 on shifter 74 will pass above cam 83 on dog 66 and the upper end of shifter 74 will engage cam 83 on said dog, and swing the dog on its fulcrum point 66′ so its lower end will be swung inwardly into vertical alignment with the hole in the lowermost record. The upper end of the shifter 74 will then strike abutment 82 on the upper end of the dog and slide the dog upwardly until the shoulder 81 is arrested by ring 70, as shown in Fig. 5. The surface 75 of shifter 74 will pass above cams 86 on fingers 68 and the upper end of said shifter will engage abutment 87 to first swing the fingers 68 on their fulcrum points 68′ to retract the knife edges 84 into the hole in the record and then slide said fingers upwardly until the shoulders at the lower ends of notches 85 are arrested by ring 70, as shown in Fig. 5. When the parts have been returned to their normal position, the stack of records will be supported by the struts and the cam plate 91 will be stopped until another record change is desired, when the same cycle of operation is repeated.

In the modification illustrated in Fig. 4ᵃ the flanges 68 for supporting the records while the struts are collapsed, in lieu of being provided with knife-edges 34 movable under the next to the lowermost record, are each provided with a serrated or toothed edge 84ᵃ which is adapted to engage the inner periphery of the hole in a record. When these serrated edges are so engaged, the fingers will support the engaged and overlying records. The operation of the device with these modified fingers will be the same as previously described except that the serrated edges will support the records at the said edges at the knife-edges do in the construction first described.

The invention exemplifies a record changer for phonographs, which is efficient in operation, is adapted to handle records of varying thickness, is simple and compact in construction, and can be economically produced.

The invention is not to be understood as restricted to the details set forth since these may be modified within the scope of the appended claims without departing from the spirit and scope of the invention.

Having thus described the invention, what I claim as new and desire to secure by Letters Patent is:

1. A record changer for phonographs, comprising: a spindle provided with a bore and means for permitting the lowermost record to be laterally offset from a stack on the spindle; struts under and supporting the stack around the spindle, foldable into the lower portion of the spindle; a dog pivotally and slidably movable in the upper portion of the spindle, provided with means at its lower end normally positioned in the spindle hole in and for laterally offsetting the lowermost record and for supporting the lowermost stack; fingers pivotally and slidably movable in the spindle, provided with edges at their lower ends for extending between contiguous records and normally positioned in a spindle opening above the lowermost record; and actuating mechanism including, means for swinging the dog to offset the lowermost record laterally while the struts are operative, means for slidably lowering the fingers onto the laterally shifted lowermost record and then pivotally shifting the fingers to extend between the two lowermost records for forcing them apart, and means for then slidably lowering and swinging the struts into the spindle for dropping the lowermost record and means for slidably lowering the dog while it is swung outwardly, and supporting the lowermost record before the struts are shifted into their operative position.

2. A record changer for phonographs, comprising: a spindle provided with a bore and means for permitting the lowermost record to be laterally offset from a stack on the spindle; struts under and supporting the stack around the spindle, foldable into the lower portion of the spindle; a dog pivotally and slidably movable in the upper portion of the spindle, provided with means at its lower end normally positioned in the spindle-hole in and for offsetting the lowermost record and for supporting the lowermost record and an abutment on its upper end for limiting the downward movement of the dog to its offsetting position; fingers pivotally and slidably movable in the spindle, provided with edges at their lower ends for extending between contiguous records and normally positioned in a spindle opening above the lowermost record; and actuating mechanism including means for swinging the dog to laterally offset the lowermost record while the struts are in supporting position, means for slidably lowering the fingers onto the laterally offset record, and means for then pivotally shifting the fingers to extend between the two lowermost records for forcing them apart, means then for lowering and swinging the struts into the spindle for dropping the lowermost record, means for engaging the abutments on dog for pivotally shifting the dog into position to offset the lowermost record, and slidably lowering the dog while it is swung outwardly to lower the stack of records before the struts are shifted into their operative position.

3. A record changer for phonographs, comprising: a spindle provided with a bore and means for permitting the lowermost record to be laterally offset from a stack on the spindle; struts under and supporting the stack around the spindle, foldable into the lower portion of the spindle; a dog pivotally and slidably movable in the upper portion of the spindle, provided with means at its lower end normally positioned in the spindle hole in and for laterally offsetting the lowermost record and for supporting the lowermost record and an abutment on its upper end; fingers pivotally and slidably movable in the spindle, provided with abutments at their upper ends and with edges at their lower ends for extending between contiguous records, and normally positioned in a spindle opening above the lowermost record; and actuating mechanism including means for swinging the dog to offset the lowermost record laterally while the struts are operative, means for slidably lowering the fingers onto the laterally shifted lowermost record, and for then pivotally shifting the fingers to extend between the two lowermost records for spacing them apart, and then lowering and swinging the struts into the spindle for dropping the lowermost record, and means for engaging the abutments on the dog and the fingers, for shifting the dog into position to offset the lowermost record, and slidably lowering the dog while it is swung outwardly under the lowermost record to lower the stack of records before the struts are shifted into their operative position.

4. A record changer for phonographs, comprising: a spindle provided with a bore and means for permitting the lowermost record to be laterally offset from a stack on the spindle; struts under and supporting the stack around the spindle, foldable into the lower portion of the spindle; a dog pivotally and slidably movable in the upper portion of the spindle, provided with means at its lower end normally positioned in the spindle-hole in and for offsetting the lowermost record and for supporting the lowermost record and an abutment on its upper end; fingers pivotally and slidably movable in the spindle, provided with edges at their lower ends for extending between contiguous records and normally positioned in a spindle opening above the lowermost record; and actuating mechanism including a plunger provided with means for swinging the dog to offset the lowermost record laterally, for lowering the fingers onto the laterally shifted lowermost record, and then pivotally shifting the fingers to extend between the two lowermost records for spacing them apart, plunger means for then lowering and swinging the struts into the spindle for dropping the lowermost record and for actuating the abutment on the dog to swing the finger, and slidably lower the dog while it is swung under the lowermost record to lower the stack before the struts are shifted into their operative position.

References Cited in the file of this patent

UNITED STATES PATENTS

| Number | Name | Date |
|---|---|---|
| 2,579,175 | Dale | Dec. 18, 1951 |
| 2,604,325 | Hansen | July 22, 1952 |

FOREIGN PATENTS

| Number | Country | Date |
|---|---|---|
| 69,274 | Norway | May 28, 1945 |
| 250,106 | Switzerland | May 1, 1948 |
| 259,867 | Switzerland | July 1, 1949 |